United States Patent [19]
Leyendecker

[11] Patent Number: 5,260,613
[45] Date of Patent: Nov. 9, 1993

[54] REAL-DATA FFT BUFFER

[75] Inventor: Robert R. Leyendecker, Castleton, Va.

[73] Assignee: The United States of America as represented by the Secretary of the Army, Washington, D.C.

[21] Appl. No.: 906,974

[22] Filed: Jun. 30, 1992

[51] Int. Cl.$^5$ ........................................ H03K 19/0175
[52] U.S. Cl. .................................... 307/475; 364/726
[58] Field of Search ................. 307/493, 475; 364/726

[56] References Cited

U.S. PATENT DOCUMENTS

| | | | |
|---|---|---|---|
| 4,138,730 | 2/1979 | Ali | 364/726 |
| 4,199,660 | 4/1980 | Dill | 370/50 |
| 4,680,589 | 7/1987 | Bryant | 342/191 |

Primary Examiner—Edward P. Westin
Assistant Examiner—Andrew Sanders
Attorney, Agent, or Firm—Michael Zelenka; William H. Anderson

[57] ABSTRACT

A FFT buffer circuit having at least three FIFO buffers and a FIFO buffer select circuit to separate incoming real-data into its in-phase and quadrature components and to output each component to a separate port for FFT, and also having a modified overflow detect circuit to automatically detect and eliminate overflow in the incoming real-data stream. In addition, the invention utilizes link hook-ups and receiver control signals for external control of both the automatic overflow reset and the data buffer timing.

2 Claims, 1 Drawing Sheet

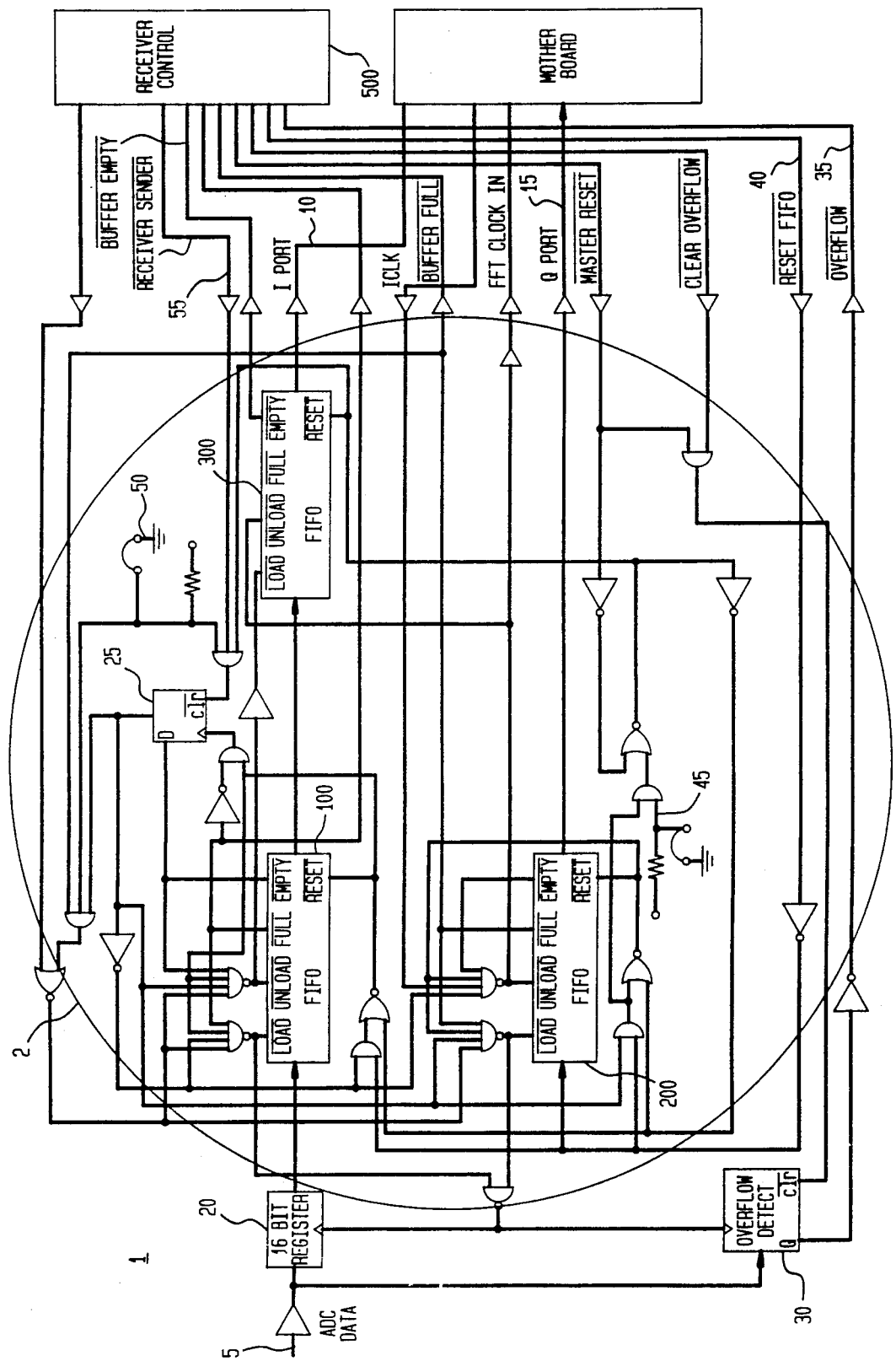

REAL-DATA FFT BUFFER

GOVERNMENT INTEREST

The invention described herein may be manufactured, used, and licensed by or for the government of the United States of America for governmental purposes without the payment of any royalty to me.

FIELD OF INVENTION

This invention relates to improved circuitry for interfacing analog to digital conversion circuits to fast fourier transformers.

BACKGROUND OF THE INVENTION

Those concerned with fast fourier transforming (FFT) analog to digital converted data (real data) have employed techniques of multiplexing and buffering that require devices that use extensive software to handle overflow problems and data clipping due to transmission interference. However, these devices do not provide any interactive receiver control over such multiplexing and buffering techniques.

Therefore, those concerned with the development of a FFT buffer apparatus have recognized the need for relieving software of the burden of overflow control and the need for obtaining receiver control interaction with a buffer. The present invention fulfills this need.

SUMMARY OF THE INVENTION

Accordingly, the general purpose of this invention is to provide a Fast Fourier Transform (FFT) buffer circuit for analog-to-digital converted data (real-data). To attain this, the present invention, in its preferred embodiment, contemplates an FFT buffer circuit having a single channel real-data input and a digital circuit means for separating the real-data into its in-phase and quadrature components. The digital circuit means preferably consists of at least three buffers and a buffer select circuit coupled to the single-channel input. The buffers are coupled such that a first and third buffers are coupled in series and the first and a second buffers are coupled in parallel, wherein the buffer select circuit alternately prompts the first buffer to fill with real-data and then prompts the second buffer to fill with real-data while at the same time, prompts the first buffer to unload its data to the third buffer. Thus, the data is separated into its in-phase and quadrature components which are then output to two separate ports. This delay created by the separation of the real-data allows for the proper buffering of the data. To further enhance performance, the present invention also utilizes an automatic digital means for detecting and eliminating overflow within the real-data stream as well as a synchronizing means for synchronizing the digital circuit means for receiver tuning. In addition, link hook-ups and receiver control signals are used for external control of both the automatic overflow reset and the data buffer timing.

Therefore, it is a primary object of this invention to provide a circuit that buffers and conditions real-data (analog to digital converted data) for FFT. Another object of the invention is to provide a circuit that automatically detects and eliminates data overflow.

A further object of the invention is to provide a circuit that enables external control over data collection and overflow elimination.

Yet a further object of this invention is to provide a circuit that has a real-data single-channel input and separate outputs for its in-phase and quadrature components.

BRIEF DESCRIPTION OF THE DRAWING

The drawing is a schematic representation of the preferred embodiment of the invention.

PREFERRED EMBODIMENT

Referring to the drawing, there is shown an FFT real-data buffer circuit card assembly (CCA) 1 having a single 16 bit input channel 5 and two output ports, in-phase port 10 and quadrature port 15. The input channel 5 is directly coupled to 16 bit register 20 which in turn is directly coupled to FIFO buffer network 2. The data flow within FIFO buffer network 2 is controlled by FIFO buffer select circuit 25 such that the in-phase and quadrature components of the incoming real-data are output separately to in-phase port 10 and quadrature port 15 for FFT. During this entire process, overflow detect circuit 30 constantly monitors the incoming real-data for overflow. When overflow is detected, overflow detect circuit 30 automatically outputs overflow signal 35 which in-turn triggers the reset of FIFO buffer network 2 causing the discard of the data block containing the overflow.

As real-data is input to single channel input 5, 16 bit register 20 fills with a 16 bit block. When full, 16 bit register 20 outputs this 16 bit data block to the FIFO buffer network 2.

The FIFO buffer network 2 is a two-cycle digital buffering stage that conditions the incoming real data for FFT. Upon the first cycle, the FIFO select circuit 25 signals FIFO 100 to load 1K of the incoming 16 bit data blocks while, simultaneously, it signals FIFO 200 and 300 to empty to quadrature port 15 and in-phase port 10, respectively (note: in the initial cycle FIFO 200 and 300 are empty). When FIFO 100 is full, it signals FIFO select circuit 25 to begin a second cycle. In the second cycle, the FIFO select circuit 25 signals FIFO 100 to unload its contents to FIFO 300, as FIFO 300 is signalled to load that data. Simultaneously, in cycle 2, the FIFO select circuit 25 signals FIFO 200 to start loading the incoming 16 bit blocks of real- data. When full, FIFO 200 sends a "buffer full" signal which restarts the entire process. Consequently, FIFO 300 and 200 output the data to In-phase port 10 and quadrature port 15, respectively.

Operating simultaneously with the FIFO buffer network, an overflow detect circuit 30 checks the highest 4 bits of this 16 bit block for data overflow. When overflow is detected, overflow detect circuit 30 sends overflow signal 35 to the receiver control board 500 which, in turn, automatically sends Reset FIFO Signal 40 causing either a partial or complete FIFO network reset depending on the state of link 45 and whether overflow is detected during FIFO 100 or FIFO 200 loading.

If overflow is detected during FIFO 100 loading, then only FIFO 100 is reset. If, however, overflow is detected during FIFO 200 loading, then link 45 determines whether only FIFO 200 or all the FIFO buffers are reset. For example, if link 45 is inserted and overflow is detected during FIFO 200 loading, then only FIFO 200 is reset. If, however, link 45 is removed, then all three FIFO buffers are reset. Consequently, link 45 creates two modes of FFT buffer operation: a 1K mode and a 2K mode.

In 2K mode, the in-phase and quadrature components must comprise 2K of data (1K for in-phase and 1K for the quadrature component). Thus, when overflow is found in either component 1K block of data, the entire 2K must be discarded. Consequently, all FIFO buffers must be reset, requiring removal of link 45. In 1K mode, however, the in-phase and quadrature components each take up 0.5K. As such, only the presently loading FIFO (FIFO 100 or 200) requires reset upon overflow detection, requiring insertion of link 45.

Ground link 50, on the other hand, controls the automatic restart of the FIFO buffer network 2 operation. Inserting link 50 enables automatic restart, whereas removing link 50 requires receiver control 500 to send a receiver settle signal 55 for restart to occur. Consequently, receiver settle signal 55 provides an automatic means for synchronizing the FFT for receiver tuning. Whenever the incoming real-data becomes out of sync with the FFT, receiver control 500 can reset the data flow with receiver settle signal 55.

Although the present invention has been described in relation to a particular embodiment, many other variations and modifications and other uses will become apparent to those skilled in the art. Therefore, the present invention should not be construed to be limited by the specific disclosure herein, but only by the appended claims.

What is claimed is:

1. An FFT buffer circuit comprising:
   a single channel real-data input;
   a digital circuit means for separating the real-data into its in-phase and quadrature components, said digital circuit means comprising at least three buffers and a buffer select circuit coupled to the single-channel input, wherein said buffers are coupled such that first and third buffers are coupled in series and the first and second buffers are coupled in parallel and wherein said buffer select circuit alternately prompts the first buffer to fill with real-data and then prompts the second buffer to fill with real-data while at the same time prompts the first buffer to unload its data to the third buffer;
   an automatic digital means for detecting and eliminating overflow within the real-data stream, said automatic digital means coupled to the single-channel input and the digital circuit means;
   a synchronizing means for synchronizing the digital circuit means for receiver tuning, said synchronizing means directly coupled to the digital circuit means;
   a pair of ground links coupled to the digital circuit means to enable external control over the automatic means for overflow elimination; and
   a two-channel output coupled directly to the digital circuit means such that the in-phase and quadrature components are each output to separate ports.

2. The FFT buffer of claim 1 wherein said automatic means for detecting and eliminating overflow comprises a D-Q flip-flop and control logic, said flip-flop output directly connected to digital circuit means for automatic reset of the buffer whenever overflow is detected in the incoming data stream.

* * * * *